United States Patent [19]

Sato et al.

[11] 4,226,429
[45] Oct. 7, 1980

[54] FLUID SEAL FOR USE IN ROTARY REGENERATOR

[75] Inventors: Hideo Sato; Osamu Kobayashi, both of Yokohama, Japan

[73] Assignee: Nissan Motor Company, Limited, Yokohama, Japan

[21] Appl. No.: 969,033

[22] Filed: Dec. 13, 1978

[30] Foreign Application Priority Data

Dec. 15, 1977 [JP] Japan .................................. 52/151028

[51] Int. Cl.³ .............................................. F16J 15/34
[52] U.S. Cl. .............................. 277/96.2; 277/DIG. 6; 165/9
[58] Field of Search .................. 277/1, 81 R, 83, 96.2, 277/224, 233, 234, 235 A, DIG. 6; 165/9

[56] References Cited

U.S. PATENT DOCUMENTS

| | | | |
|---|---|---|---|
| 3,601,413 | 8/1971 | Darnell | 277/96.2 |
| 3,633,926 | 1/1972 | Hryniszak et al. | 165/9 X |
| 3,659,861 | 5/1972 | Rao et al. | 165/9 X |
| 3,730,538 | 5/1973 | Silverstone et al. | 277/DIG. 6 X |
| 3,746,352 | 7/1973 | Bao et al. | 277/96 X |
| 3,761,101 | 9/1973 | Good et al. | 277/96.2 |
| 3,845,545 | 11/1974 | Surrall et al. | 277/96 X |
| 3,899,182 | 8/1975 | Johnson | 277/96.2 |
| 3,903,959 | 9/1975 | Fushimi et al. | 277/96.2 X |
| 3,930,071 | 12/1975 | Rao et al. | 277/96.2 X |
| 4,103,908 | 8/1978 | Kobayashi et al. | 277/96.2 |

Primary Examiner—Robert S. Ward, Jr.
Attorney, Agent, or Firm—Schwartz, Jeffery, Schwaab, Mack, Blumenthal & Koch

[57] ABSTRACT

A rubbing contact fluid seal member is provided on the hot side of a rotary regenerator of a gas turbine engine to prevent high temperature exhaust gases from mixing with counterflowing combustion air, maintaining rubbing contact with a radial surface of a rotatable matrix. The seal member is formed with a heat-resistant layer of silicon carbide at a part of its surface which is in direct contact with the high temperature exhaust gas.

17 Claims, 5 Drawing Figures

FLUID SEAL FOR USE IN ROTARY REGENERATOR

BACKGROUND OF THE INVENTION

This invention relates to a rubbing contact fluid seal suitable for use in a rotary regenerator of a gas turbine application, and more particularly to the rubbing contact fluid seal made of carbon base material.

SUMMARY OF THE INVENTION

It is the prime object of the present invention to provide an improved rubbing contact fluid seal used in a rotary regenerator of a gas turbine engine, by which a sufficient seal is provided to prevent high temperature exhaust gas from mixing with counterflowing combustion air, maintaining a considerably low friction between it and a rotatable annular matrix of the regenerator.

It is another object of the present invention to provide an improved rubbing contact fluid seal used in a rotary regenerator of a gas turbine engine, which can maintain a sufficient fluid seal to prevent high temperature exhaust gas from mixing with the counter-flowing combustion air on the hot side of the regenerator relative to a rotatable annular matrix, even though the seal member of the seal is made of carbon base material.

It is further object of the present invention to provide an improved rubbing contact fluid seal used on the hot side of a rotary regenerator of a gas turbine engine, whose seal member is made of carbon base material having a low coefficient of friction, at least a part of the surface of the seal member being covered with a heat-resistant layer for preventing the seal member from contacting with high temperature exhaust gases.

BRIEF DESCRIPTION OF THE DRAWINGS

Other objects, features and advantages of the improved rubbing contact fluid seal according to the present invention will become more apparent from the following description taken in conjunction with the accompanying drawings, in which.

DETAILED DESCRIPTION OF PREFERRED EMBODIMENTS

Figure 1:
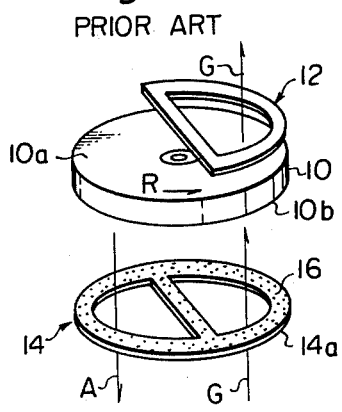
FIG. 1 is a schematic illustration of an essential part of a rotary regenerator of a gas turbine engine including an example of a prior art rubbing contact fluid seal.

Gas turbine engines in general use rotary regenerators to recover useable heat from exhaust gas to preheat incoming combustion air in order to improve the thermal efficiencies and fuel economies of the engines. FIG. 1 shows an example of a prior art rotary regenerator portion of the gas turbine engine which includes a rotatable annular or disc matrix 10. The matrix 10 is of a structure defining pores (not shown) extending between the opposite radial faces 10a and 10b, the matrix being rotated in the direction of an arrow R. It will be understood that the heat of the exhaust gases indicated by an arrow G is supplied through the rotating matrix 10 to the incoming air indicated by an arrow A from a compressor. A necessary requirement of the regenerator system is an effective seal across the opposite radial faces 10a and 10b of the matrix 10 to prevent leakage of the high pressure incoming air A into the counterflowing exhaust gases G. In this regard, a cold side seal 12 is provided in rubbing contact with the radial face 10a of the matrix 10 and accordingly is required to operate at a maximum temperature of about 300° C. Conversely, a hot side seal is provided in rubbing contact with the other radial face 10b of the matrix 10 and accordingly is required to operate at a temperature up to 650° C. The desired properties of the rubbing seal material are that it has good oxidation resistance and thermal stability, good wear resistance, and a relatively low coefficient of friction over a wide range of temperatures.

Hence, the cold side seal 12 is usually made of carbon base material which has a low coefficient of friction. However, the carbon base material can not be used as the hot side seal 14 since the carbon base material is not durable at temperatures higher than about 400° C. in an oxidizing atmosphere such as the high temperature exhaust gas. Accordingly, the hot side seal 14 is usually formed of a metal substrate plate 14a whose surface is coated with a coating which is fomred by spraying a mixture of nickel oxide(NiO) and calcium fluoride($CaF_2$), the coated surface of the substrate plate slidably contacting with the rotating radial face 10b of the matrix 10.

However, a the hot side seal has shortcomings in that the thickness of the coating is limited to about 2 mm and therefore the durability of the coating is considerably low. Additionally, when a part of the metal substrate plate 14a comes into direct contact with the rotating radial face 10b of the matrix 10 by any reason such as uneven wear of the coating, this may damage a considerably expensive matrix 10.

In view of the above, the present invention contemplates to overcome the shortcomings encounted in the above-mentioned prior art, by forming a heat-resistant layer at least on the surface of the hot side seal which is in direct contact with high temperature exhaust gas before passing through the matrix. This has been accomplished with recognition of the fact that carbon material is durable even at a considerably high temperature, higher than 1000° C., if an oxidizing atmosphere is prevented from contacting with the carbon material.

Figure 2:
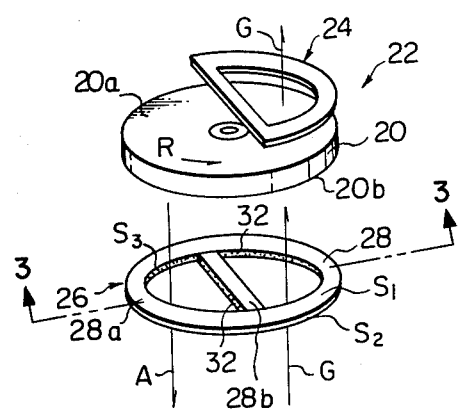
FIG. 2 is a schematic illustration of an essential part of a rotary regenerator of a gas turbine engine, including a preferred embodiment of a rubbing contact fluid seal in accordance with the present invention.
Figure 3:
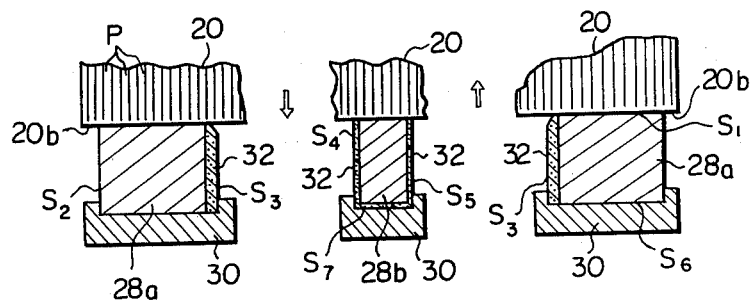
FIG. 3 is a cross-sectional view showing in detail the rubbing contact fluid seal of FIG. 2.

Referring now to FIGS. 2 and 3 of the drawing, a preferred embodiment of a rubbing contact fluid seal according to the present invention is shown in combination with an annular or disc-type matrix 20 forming part of a rotary regenerator portion 22 of a gas turbine engine. The annular matrix 20 is made of metal or ceramics and of a structure defining pores and passages P extending between the opposite radial faces 20a and 20b. The annular matrix 20 is constructed and arranged to rotate in the direction of an arrow R so that the heat of high temperature exhaust gas(at about 700°-750° C.) indicated by arrows G is supplied to low temperature incoming air (at about 200° C.) indicated by an arrow A. It will be understood that the exhaust gas is conducted into the matrix 20 after rotating a turbine (not shown) of the gas turbine engine. Otherwise, the incoming air is introduced under pressure from a compressor (not shown). By virtue of this regenerator portion including the rotatable matrix 20, the temperature of the incoming air is raised to about 550° to 600° C., whereas the temperature of the exhaust gas is lowered to about 350° C.

An upper rubbing contact fluid seal 24 is provided in rubbing contact with the rotating radial face 20a of the matrix 20 to prevent the exhaust gas G from being mixed with the incoming air A. The upper seal 24 lies on a cold side of the regenerator portion relative to the matrix 20 and is referred to as a "cold side seal". A lower rubbing contact fluid seal 26 is provided in rubbing contact with the other face 20b of the matrix 20 to prevent the incoming air and exhaust gas from mixing with each other. This lower seal 26 lies on a hot side of the regenerator portion relative to the matrix 20 and accordingly is referred to as a "hot side seal". The lower seal 26 comprises a seal member 28 made of carbon material such as graphite, or of carbon base material. The seal member 28 consists of an annular portion 28a and a cross arm portion 28b. As clearly shown in FIG. 3, the seal member 28 is supported on a stationary holder 30 so that the top flat surface (no numeral) of the seal member 28 contacts the rotating radial face 20b of the matrix 20.

As shown, the annular portion 28a of the seal member 28 is formed with a top annular flat surface $S_1$, outer and inner cylindrical side surfaces $S_2$ and $S_3$, and a bottom annular flat surface $S_6$. The top and bottom annular flat surfaces $S_1$ and $S_6$ are parallel with each other. The outer and inner cylindrical side surfaces $S_2$ and $S_3$ are concentric with each other. The annular portion 28a is in direct contact at its surface $S_1$ with the radial face 20b of the matrix 20, and in direct contact at its surface $S_3$ with the hot exhaust gases G. The cross arm portion 28b is formed with flat side surfaces $S_4$ and $S_5$ which face the inner cylindrical side surface $S_3$ of the annular portion 28a. It will be understood that the flat side surface $S_5$ is in direct contact with the exhaust gases G. It is to be noted that the annular portion 28a of the seal member 28 is formed at its inner cylindrical surface with a heat-resistant layer 32. Similarly, the cross arm portion 28b is formed with a heat-resistant layer 32 at its bottom flat surface $S_7$ in addition to the flat side surfaces $S_4$ and $S_5$. In this instance, the heat-resistant layer is substantially made of silicon carbide(SiC).

Figure 4:
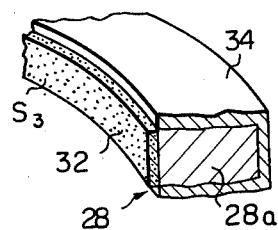
FIG. 4 is a perspective view showing an example of a method for preparing the rubbing contact fluid seal of FIG. 3.

The forming method of the heat-resistant layer 32 will be illustrated with reference to FIG. 4 in which the formation of the heat-resistant layer only for the annular portion 28a of the seal member 28 is exemplified. The annular portion 28a is first covered with a covering member 34, maintaining the inner cylindrical surface $S_3$ uncovered. Thereafter, the partly covered seal member 28 is disposed in a container (not shown) filled with silicon monoxide(SiO) gas so that the uncovered cylindrical side surface $S_3$ is exposed to silicon monoxide gas. Thus, the heat-resistant layer 32 of silicon carbide is formed on the uncovered cylindrical side surface $S_3$ in accordance with the reaction represented by the equation:

$$2C + SiO \rightarrow SiC + CO.$$

With the above-discussed arrangement, the surfaces of the seal member 28 in direct contact with the hot exhaust gas are covered with the heat-resistant layer 32 and therefore the seal member 28 is prevented from being contacted with the high temperature exhaust gas G. This has enabled employment of the seal member made of carbon base material on the hot side of the regenerator portion 22. It will be appreciated that the heat-resistant layer 32 is not formed on the top flat or rubbing contact surface $S_1$ of the seal member 28 in order to leave exposed the carbon base material which has a low coefficient of friction and a lubricating ability. Therefore, an excellent rubbing contact gas seal is provided between the top flat surface $S_1$ of the seal member 28 and the rotating radial face 20b of the annular matrix 20.

Figure 5:
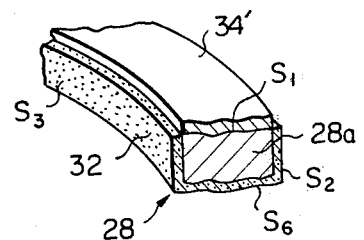
FIG. 5 is a perspective view showing another example of a method for preparing the rubbing contact fluid seal in accordance with present invention.

Otherwise, the heat-resistant layer 32 may be formed on all surfaces except for the top flat surface $S_1$ of the seal member 28, the top flat surface being in rubbing contact with the radial face 20b of the matrix 20. This is achieved by covering only the top surface $S_1$ of the seal member 28 with a cover plate member 34' as shown in FIG. 5 and thereafter exposing the seal member 28 to SiO gas to form the heat-resistant layer 32 covering the surfaces of the annular portion 28a except for the top flat surface of the seal member 28.

The above-mentioned heat-resistant layer 32 of silicon carbide may also be formed by first putting silicon(Si) powder on the required surface or surfaces of the seal member 28 of carbon material and thereafter heating the sealing member 28 with silicon powder at a high temperature such as 1800° C. in the atmosphere of an inert gas such as nitrogen, argon or helium.

It will be appreciated that, since the hardness of SiC is considerably high, too thick of a layer of SiC promotes the wear of the rotating matrix 20 of the regenerator portion. Consequently, it is desirable to make the thickness of the heat-resistant layer of SiC as low as possible. However, it is preferable to form the heat-resistant layer 32 having the thickness ranging from about 0.1 to 0.4 mm in view of preventing the carbon base material from the heat and the oxidation effect of the high temperature exhaust gas.

While the heat-resistant layer 32 has been shown and described to be made of SiC, it will be understood that the layer 32 may be a coating which is formed by spraying the mixture of NiO and $CaF_2$ onto the required surface or surfaces of the seal member made of a carbon base material. In this instance, the thickness of the layer of the coating is preferably in the range of from about 0.1 to 1.0 mm.

It is to be noted that the heat-resistant layers 32 formed by the above-discussed ways are not liable to peel off since the carbon base material is porous and accordingly the surface of the seal member made of the carbon base material is considerably rough. In order to further secure the adherence of the heat-resistant layer 32 on the surface of the seal member 28, it is preferable to select the carbon base material and the material of the heat-resistant layer 32 so that their coefficients of thermal expansion are close to each other.

As appreciated from the foregoing discussion, the rubbing contact fluid seal according to the present invention gives the following advantages: Since the seal member 28 is made of carbon base material, the allowable wear distance(thickness) of the seal member is about ten times of the conventional spray-coated metal seal member. This improves the durability of the rubbing contact fluid seal in accordance with the present invention. Furthermore, the carbon base material is lower in coefficient of friction and has lubricating ability, and accordingly the seal member 28 made of the carbon base material can uniformly contact with the rotating radial face of the matrix 20. Even if the seal member 28 can not uniformly contact with the radial face of the matrix 20, it never damages the radial face of the matrix 20.

What is claimed is:

1. A rubbing contact fluid seal for use on the hot side in the rotary regenerator portion of a gas turbine engine, which portion includes a rotatable annular matrix, said seal comprising:
   a seal member made of carbon base material, said seal member having first and second surfaces, said first surface being contactable with the rotatable radial face on the hot side of said rotatable annular matrix, said second surface being directly contactable with hot exhaust gases before they pass through the matrix and with hot intake air after it passes through the matrix; and
   a heat-resistant layer formed on said second surface, allowing the major part of said first surface of carbon base material to be exposed as it is for rubbing contact with the hot side radial face of the rotatable annular matrix.

2. A rubbing contact fluid seal as claimed in claim 1, in which said heat-resistant layer comprises silicon carbide.

3. A rubbing contact fluid seal as claimed in claim 2, in which said heat-resistant layer is formed by contacting said second surface of said seal member with silicon monoxide gas under conditions so that said surface and the silicon monoxide gas react with each other.

4. A rubbing contact fluid seal as claimed in claim 3, in which the thickness of said heat-resistant layer is in the range from 0.1 to 0.4 mm.

5. A rubbing contact fluid seal as claimed in claim 2, in which said heat-resistant layer is formed by first putting silicon powder on said second surface of said seal member and thereafter heating the silicon powder on said second surface in an atmosphere of inert gas to a temperature sufficient to produce silicon carbide.

6. A rubbing contact fluid seal as claimed in claim 5, in which the thickness of said heat-resistant layer is in the range from 0.1 to 0.4 mm.

7. A rubbing contact fluid seal as claimed in claim 3, further comprising a stationary holder on which said seal member is securely mounted.

8. A rubbing contact fluid seal as claimed in claim 7, in which said seal member includes an annular portion having inner and outer cylindrical side surfaces which are concentrically arranged with each other, the inner cylindrical side surface being directly contactable with the exhaust gases before they pass through the matrix and comprising a portion of said second surface, and top and bottom annular flat surfaces which are parallel with each other, the top flat annular surface being directly contactable with the rotatable radial face of the matrix and comprising said first surface, and the bottom flat annular surface being secured to said stationary holder.

9. A rubbing contact fluid seal as claimed in claim 8, in which said heat-resistant layer is formed on the inner and outer cylindrical side surfaces and on the bottom flat annular surface of said annular member.

10. A rubbing contact fluid seal as claimed in claim 3, in which said heat-resistant layer is formed by partly covering the surfaces of said seal member with a covering member, maintaining said second surface of said seal member uncovered, and thereafter contacting said uncovered surface of said seal member with silicon monoxide gas to cause carbon of said with uncovered surface to react with silicon monoxide gas.

11. A rubbing contact fluid seal as claimed in claim 8, in which said heat-resistant layer is formed by covering the outer cylindrical side surface and the top and bottom flat annular surfaces with a covering member, and thereafter contacting the inner cylindrical side surface with silicon monoxide gas to cause carbon of the inner cylindrical side surface of said seal member to react said with silicon monoxide gas.

12. A rubbing contact fluid seal as claimed in claim 9, in which said heat-resistant layer is formed by covering only the top flat annular surface of said seal member with a covering member, and thereafter contacting the inner and outer cylindrical surfaces and the bottom flat annular surface with silicon monoxide gas to cause carbon of the three surfaces of the seal member to react with said silicon monoxide gas.

13. A rubbing contact fluid seal as claimed in claim 1, in which said heat-resistant layer is a coating formed by spraying a mixture of nickel oxide and calcium fluoride onto said second surface of said seal member.

14. A rubbing contact fluid seal as claimed in claim 13, in which the thickness of said heat-resistant layer is in the range from 0.1 to 1.0 mm.

15. A rubbing contact fluid seal for use on the hot side in the rotary generator portion of a gas turbine engine, which portion includes a rotatable annular matrix, said seal comprising:
   a seal member comprising a carbon base material and formed with first and second surfaces, said first surface being contactable with the rotatable radial face on the hot side of said rotatable annular matrix, said second surface being directly contactable with hot exhaust gases before they pass through the matrix and hot intake air after it passes the matrix; and
   a heat-resistant layer formed on said second surface, allowing the major part of said first surface of carbon base material to be exposed as it is for rubbing contact with the hot side radial face of the rotatable annular matrix, said heat-resistant layer comprising a material selected from the group consisting of silicon carbide and a mixture of nickel oxide and calcium fluoride.

16. A rubbing contact fluid seal for use on the hot side in the rotary regenerator portion of a gas turbine engine, which portion includes a rotatable annular matrix, said seal comprising:
   a seal member comprising a carbon base material and formed with an annular portion having inner and outer cylindrical side surfaces which are concentrically arranged with each other, the inner cylindrical side surface being directly contactable with hot exhaust gases before they pass through the matrix and hot intake air after it passes through the matrix, and top and bottom annular flat surfaces which are parallel with each other, said top flat annular surface being directly contactable with the hot side rotatable radial face of the matrix and the bottom flat annular surface being secured to a stationary holder; and
   a heat-resistant layer formed on the inner cylindrical side surface of the annular portion of said seal member, allowing the major part of said top flat annular surface of carbon base material to be exposed as it is for rubbing contact with the hot side radial face of the rotatable annular matrix, said heat-resistant layer comprising a material selected from the group consisting of silicon carbide and a mixture of nickel oxide and calcium fluoride.

17. A fluid seal according to claim 16, wherein said seal member further comprises a cross-piece extending across said annular portion, said cross-piece having a top surface which comprises exposed carbon base material and which is directly contactable with the hot side rotatable radial face of the matrix, and two side surfaces which are coated by said heat-resistant layer.

* * * * *